Figure 1:
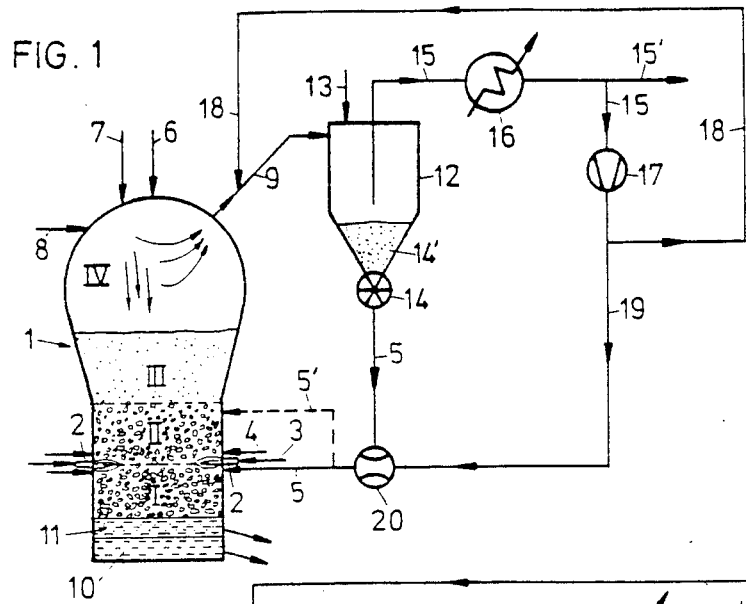

United States Patent [19]

Kepplinger

[11] Patent Number: 4,978,387
[45] Date of Patent: Dec. 18, 1990

[54] PROCESS FOR THE PRODUCTION OF MOLTEN PIG IRON

[75] Inventor: Werner Kepplinger, Linz, Austria

[73] Assignee: Deutsche Voest-Alpine Industrienalagenbau GmbH, Fed. Rep. of Germany

[21] Appl. No.: 427,186

[22] Filed: Oct. 25, 1989

[30] Foreign Application Priority Data

Oct. 25, 1988 [AT] Austria .................................. 2642/88

[51] Int. Cl.$^5$ ............................................. C21B 11/00
[52] U.S. Cl. .......................................... 75/445; 75/446
[58] Field of Search ....................... 75/26, 38, 40, 445, 75/446; 266/172, 160

[56] References Cited

U.S. PATENT DOCUMENTS 4,543,123  9/1985  Vuletic .................................... 75/38
4,673,432  6/1987  Hauk ...................................... 75/38

FOREIGN PATENT DOCUMENTS 2521038  11/1975  Fed. Rep. of Germany .
3535572   4/1987  Fed. Rep. of Germany .

OTHER PUBLICATIONS

"Kawasaki Steel Gives Details of its New Ironmaking Process", *The Tex Report*, vol. 19, No. 4,418, Apr. 15, 1987, pp. 5–9.

*Primary Examiner*—Melvyn J. Andrews
*Attorney, Agent, or Firm*—Ostrolenk, Faber, Gerb & Soffen

[57] ABSTRACT

To produce molten pig iron by melt-reduction of iron ores of various grain sizes containing a fraction A including grain sizes to which diameters of less than 0.2 mm correspond, by pre-reducing the ore by reducing gas, completely reducing the pre-reduced material and smelting it to molten pig iron in a melter gasifier, the pre-reduced ore fraction A is separated from a fraction B including larger grain-size particles by classification by means of reducing-gas and the two fractions A and B are completely reduced separately and fed to the melting zone of the melter gasifier.

A plant for carrying out the process according to the invention consists of a melter gasifier and a reduction cyclone, a reduction reactor being optionally arranged in the reducing gas duct between melter gasifier and reduction cyclone, which reduction reactor includes a fluidized bed formed by the reducing gas and, if desired, also a fixed bed and, on its delivery side, is connected with the melter gasifier via at least one transporting device for reduced iron ore.

12 Claims, 3 Drawing Sheets

PROCESS FOR THE PRODUCTION OF MOLTEN PIG IRON

The invention relates to a process for the production of molten pig iron by melt reduction of iron ores of various grain sizes including a fraction A comprised of grain sizes to which diameters of less than 0.2 mm correspond, the ore being pre-reduced by reducing gas, the pre-reduced material being completely reduced and melted to molten pig iron in a melter gasifier, as well as to an arrangement for carrying out the process.

Processes for working up granular ores having grain diameters smaller than 0.1 mm have been known (cf., e.g., World Steel and Metalworking, Vol. 6, 84/85, p. 19). Fine ores having particle diameters of less than 0.5 mm are capable of being reduced in a circulating fluidized layer, as is described, e.g., in DE-A-25 21 038. However, none of these processes is suited for processing iron ores of wide grain ranges as represented, for instance, by fine ores in unsieved form or by fine ores sieved from a coarse fraction of ores. Such ores cannot be processed to pig iron on a large scale without preliminary treatment in the cooking furnace or after other melt-reduction procedures. This holds, in particular, for fine ores that contain a dust portion, which means ore particles having diameters of less than 0.2 mm (fraction A). Such ores must be pre-ground and agglomerated to a uniform grain size prior to smelting.

A process and a plant for the melt-reduction of fine ore is known from DE-C-35 35 572, according to which the ore, after having passed two pre-reduction aggregates not described in detail, is fed into the melter gasifier at the level of the oxygen blowing plane. That plant, however, is not suited for processing fine ores that exhibit a wide range of grain sizes, because during charging into the first pre reduction aggregate at least the dusty ore portions are carried away with the counterflowing reducing gas, thus being discharged again. Refeeding of these portions is not provided in DE-C-35 35 572.

Another disadvantage of the process mentioned consists in that the fine ore is supplied to the melter gasifier near the melting zone in a pre reduced state, thus requiring additional heat, which must be made available by plasma burners.

A further process for the melt-reduction of fine ores is described in the pamphlet "The Tex Report" (Vol. 19, No. 4, 418, pp. 5 to 9, 1987), according to which the pre-reduction of fine ores takes place in the fluidized bed of a pre-reduction reactor allocated to the melter gasifier. But also according to that process, post-reduction takes place only in the melter gasifier, which involves a high a energy consumption and inevitably to a temperature decrease. Also there, the problem of processing the dusty portion automatically carried away with the reducing gas and discharged from the pre-reduction reactor remains unsolved.

It is the aim of the present invention to eliminate these disadvantages at the processing of iron ores of various grain sizes, in particular of those including a dust portion (fraction A1). and to provide a process and an arrangement by which ores having wide grain size spectrums are capable of being smelted to molten pig iron according to the melt-reduction method in a melter gasifier without pre-grinding and agglomeration.

In accordance with the invention, this aim is reached by separating the pre-reduced ore fraction A from a fraction B comprised of larger grain-size particles by classification by means of the reducing gas, completely reducing the two fractions A and B separately and feeding them to the melting zone of the melter gasifier.

Advantageously, the complete reduction of fraction A is carried out in a reduction cyclone, into which the reducing gas loaded with the pre reduced fraction A is conducted. Owing to the small diameters of the ore particles of fraction A, such a short span of time as is usually required for the separation of a solid in a cyclone will suffice for complete reduction.

The remaining fraction B, during the separation of fraction A, also is being pre-reduced to a certain degree by the reducing gas, the degree of pre-reduction naturally being the lower the larger the ore particles. Pre-reduced ore particles having diameters of below 2 mm are completely deducible in a simple manner by being passed under the action of gravity through a fluidized bed flowed through by reducing gas, and completely reduced. Ore particles of this size, after such a treatment, practically have the same high degree of metallization as fraction A upon separation in the reduction cyclone, because they are contacted by the reducing gas in the fluidized bed for a comparatively longer period of time. Compared to the shaft furnaces usually employed in direct reduction processes, the fluidized bed allows for a more rapid and, thus, more efficient reduction.

Suitably, the two completely reduced fractions A and B are smelted to molten pig iron in a melter gasifier by being fed to the melter gasifier in the region of the oxygen blowing plane or above this plane in the region of the coke bed. Due to the high degree of metallization of the reduced fractions A and B, less heat is required within the melter gasifier for the production of molten pig iron.

If fraction B contains grain sizes corresponding to diameters of a maximum of 5 mm, this fraction advantageously also is passed through a fluidized bed flowed through by reducing gas, whereupon the portion B1 having grain sizes corresponding to diameters of below 2 mm is separated and the portion B2 having grain sizes corresponding to diameters of at least 2 mm additionally is passed under the action of gravity through a fixed bed flowed through by reducing gas, thus being further reduced.

Thereby it is ensured that even those ore particles which have diameters of at least 2 mm and at most 5 mm attain a very high degree of metallization such that the reduced portion B1 may be fed to the melter gasifier in the region of the oxygen blowing plane or above this plane in the region of the coke bed and the reduced portion B2 may be supplied to the melter gasifier above the tuyere plane, molten pig iron being obtained.

If fraction B additionally contains grain sizes corresponding to diameters up to 20 mm, preferably up to 10 mm portion B2, which in this case includes particles having diameters of from 2 mm to 20 mm, preferably 2 mm to 10 mm, suitably is introduced into the quieting zone of the melter gasifier, which is located above the fluidized bed of the same.

A plant for carrying out the process according to the invention consists of the combination of a melter gasifier and a reduction cyclone, the reduction cyclone, on its delivery side, communicating with the lower part of the melter gasifier via a transporting means for reduced iron ore and a reducing gas duct leading from the quieting space of the melter gasifier to the reduction cyclone.

A plant of this type is particularly suited for processing dusty ores and fine ores having grain sizes corresponding to diameters up to 0.5 mm in an economic way. Compared to the plants for the direct reduction of iron ore presently in use, the plant according to the invention, moreover, excels by its compactness.

A preferred embodiment of the plant according to the invention is characterized in that a reduction reactor is arranged in the reducing gas duct between melter gasifier and reduction cyclone, which reduction reactor comprises a fluidized bed formed by the reducing gas and, if desired, also a fixed bed and, on its delivery side, is connected with the melter gasifier via at least one transporting means for reduced iron ore. By this plant, it is possible to process ore mixtures of various grain sizes having particle diameters up to 20 mm in a very simple and economic way.

The invention will now be explained in more detail with reference to the drawing, wherein FIGS. 1 to 4 each are a schematic illustration of a particular embodiment of the plant according to the invention.

In FIG. 1 a melter gasifier is denoted by 1, which, in the embodiment illustrated, includes a lower section 1', a central section 1'' and a widened upper section 1'''. The lower section 1' is destined to receive the molten bath. Into the central section 1'' tuyeres 2 (burners) including feed ducts 3 for oxygen run. Moreover, a feed duct 4 for carbonaceous material and a duct 5 for completely reduced ore enter immediately in the region of the tuyere plane. Alternatively, this duct 5 may run into the melter gasifier 1 also above the tuyere plane in the region of the upper coke bed II, as is illustrated in FIG. 1 in broken lines by duct 5'.

In the upper, widened region 1''', the melter gasifier 1 comprises charging means 6 for lumpy coal having grain sizes corresponding to diameters of up to 40 mm, 7 for ore and 8 for fluxes. Furthermore, a reducing gas duct 9 is provided in the upper section 1''' for conducting away reducing gas formed in the melter gasifier.

In the central section 1'', fixed beds I and II (fixed bed zones) are formed by coarser coke particles. The melt bath collecting therebelow consists of molten metal 10 and of slag 11, one tap each being provided for the two components. The fixed bed I does not include a gas feed, no gas being passed therethrough. Above it, a fixed bed II is formed in which the coke particles are flowed through by the oxygen-containing gas streaming out of the feed duct 3 under formation of carbon monoxide. Above the fixed bed II a fluidized bed III is formed, which is kept in motion by the reducing gas forming in the fixed bed II. Smaller coal or coke particles remain in the fluidized-bed zone III. Larger coal and coke particles, for which the clear tube velocity of the gas flow lies below the fluidizing point of a corresponding particle bed, merely are braked, falling through fluidized bed III and depositing under the formation of fixed beds II and III.

Above the fluidized bed III, there is the quieting zone IV, into which the iron ore, i.a., is charged.

By 12 a reduction cyclone is denoted, which is run into by the reducing gas duct 9 and a charging means 13 for fluxes. On the lower end of the reduction cyclone there is provided a discharge means 14 for completely reduced dusty ore 14', which is admitted to duct 5.

From the upper part of the reduction cyclone, top gas freed from suspended reduced dusty ore is discharged through top gas duct 15, is cooled in the cooler 16, is compressed in the cooling gas blower 17 and is fed either via a return duct 18 into the reducing gas duct 9 for cooling the gas—dusty ore suspension from the melter gasifier 1, or via a discharge duct 19 by means of an injector 20 into duct 5. It is also possible to remove top gas from the plant through branch duct 15' and to supply it to other purposes.

The embodiment of the plant according to the invention illustrated in FIG. 1 is suited for processing ferrous fine ores having grain sizes corresponding to diameters of 0.5 mm at most, but in particular dusty ores, the ore particles having diameters of below 0.2 mm (fraction A). Ore of this type is charged into the quieting zone (IV) of the melter gasifier 1, which has a temperature of about 1,000° C. in the upper part of the quieting zone (IV), where it is pre-reduced by the counterflowing reducing gas formed in the lower part of the melter gasifier.

The pre-reduced fraction A is almost totally carried away with the reducing gas and fed into the reduction cyclone 12 through the reducing gas duct 9, the gas—dusty ore suspension being cooled to about 800° C. at that point of time.

In the reduction cyclone 12, fraction A is completely reduced by reducing gas and separated from the reducing gas by the action of the cyclone. Subsequently, the completely reduced fraction A is admitted to duct 5 via the discharge means 11 and directly blown into the melting zone of the melter gasifier by means of top gas, i.e., either into the region of the oxygen blowing plane or into the region of the coke bed II thereabove.

The fine ore fraction having particle diameters of at least 0.2 mm (and at most 0.5 mm) remaining in the quieting zone IV of the melter gasifier 1 also is pre-reduced in the quieting zone, yet it cannot be discharged by the reducing gas flow and reaches fixed beds II and I via fluidized bed III under the action of gravity, being completely reduced and smelted.

Ore fractions having particle diameters of more than 0.5 mm cannot be processed in the plant illustrated in FIG. 1, because they are not capable of being completely reduced to a satisfactory extent in the melter gasifier.

Figure 2:
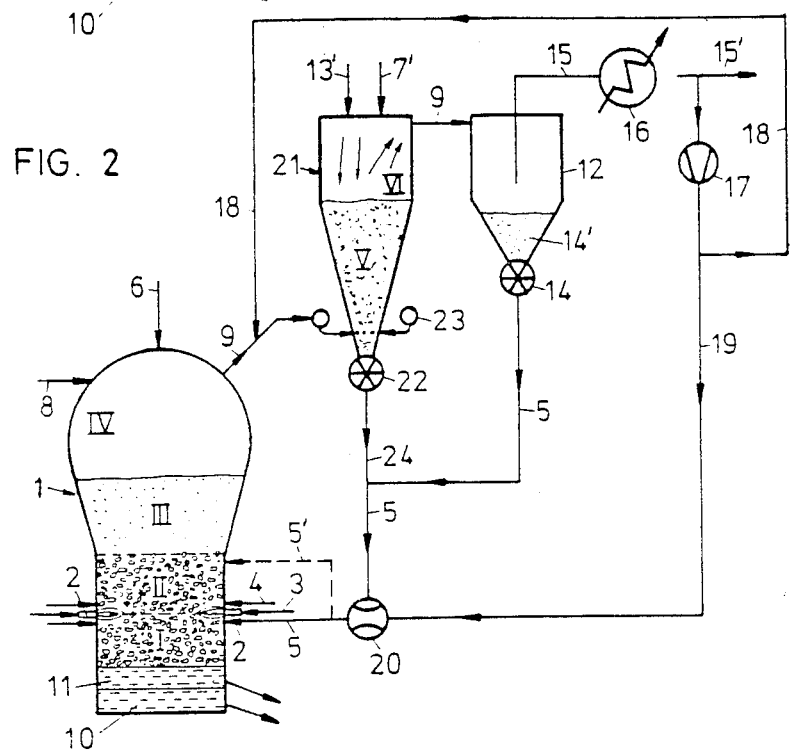

The processing of ore of this type is effected in the embodiment of a plant according to the invention illustrated in FIG. 2. It differs from the variant according to FIG. 1 primarily in that a reduction reactor 21 is arranged in the reducing gas duct 9 between the melter gasifier 1 and the reduction cyclone 12, comprising charging means 13' for fluxes and 7' for the ore and a discharge means 22 for the completely reduced fine ore.

In the interior of the reduction reactor 21, a fluidized bed V of ore is maintained by reducing gas from the melter gasifier 1 blown in at the plane of tuyeres 23 fed by the reducing gas duct 9. Above the fluidized bed V, there is a quieting zone VI. A duct 24 for completely reduced fine ore follows upon the discharge means 22, running into duct 5.

The remaining plant parts depicted in FIG. 2 correspond to those illustrated in FIG. 1 and described above.

The embodiment of the plant according to the invention illustrated in FIG. 2 is particularly suited for processing fine ores having ore particles of diameters up to 1 mm. Such ores are charged into the quieting zone VI of the reduction reactor 21 by the charging means 7' and are partially pre-reduced by the counterflowing reducing gas produced in the melter gasifier 1 and blown through the reducing gas duct 9 into the lower part of the reduction reactor 21, maintaining the fluidized bed V. Analogously to the procedures occurring in the quieting zone IV of the melter gasifier 1 according to FIG. 1, the reducing gas is conducted into the reduction cyclone through the continuing reducing gas duct 9 leading away from the upper part of the reduction reactor 21, entraining the pre-reduced fraction A. The latter fraction is completely reduced in the reduction cyclone 12 and is supplied to the melter gasifier 1 as described with reference to FIG. 1.

The pre reduced fine ore fraction remaining in the quieting zone VI, which includes grain sizes corresponding to diameters of from 0.2 mm to 1 mm, cannot be discharged by the reducing gas and passes the fluidized bed V under the action of gravity, being completely reduced, discharged on the lower end of the reduction reactor, fed into duct 5 and supplied to the melter gasifier together with the completely reduced fraction A.

Advantageously, the reduction reactor 21 is conically designed at least in its lower part, thus imparting different flow speeds to the reducing gas, which promotes the separation of the two ore fractions. Despite the larger diameters of the particles of fraction B, these have approximately the same high degree of metallization as the fraction A completely reduced in the reduction cyclone 12, after having been discharged from the reduction reactor, because the larger particles in the fluidized bed are contacted by the reducing gas for a sufficiently long period of time.

The processing of ores exhibiting a still wider grain range is achieved in a plant substantially designed in a manner analogous to the embodiment illustrated in FIG. 2, but additionally comprising a fixed bed VII of ore in the reduction reactor 21, disposed below the fluidized bed V. Two of such embodiments of the plant according to the invention are represented in FIGS. 3 and 4.

Figure 3:
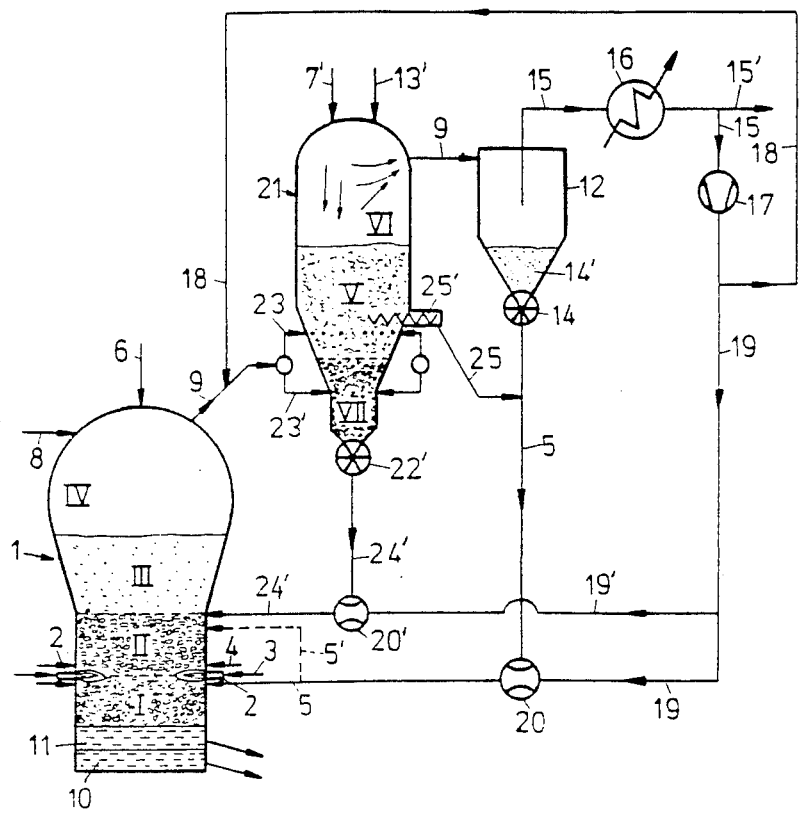
Figure 4:
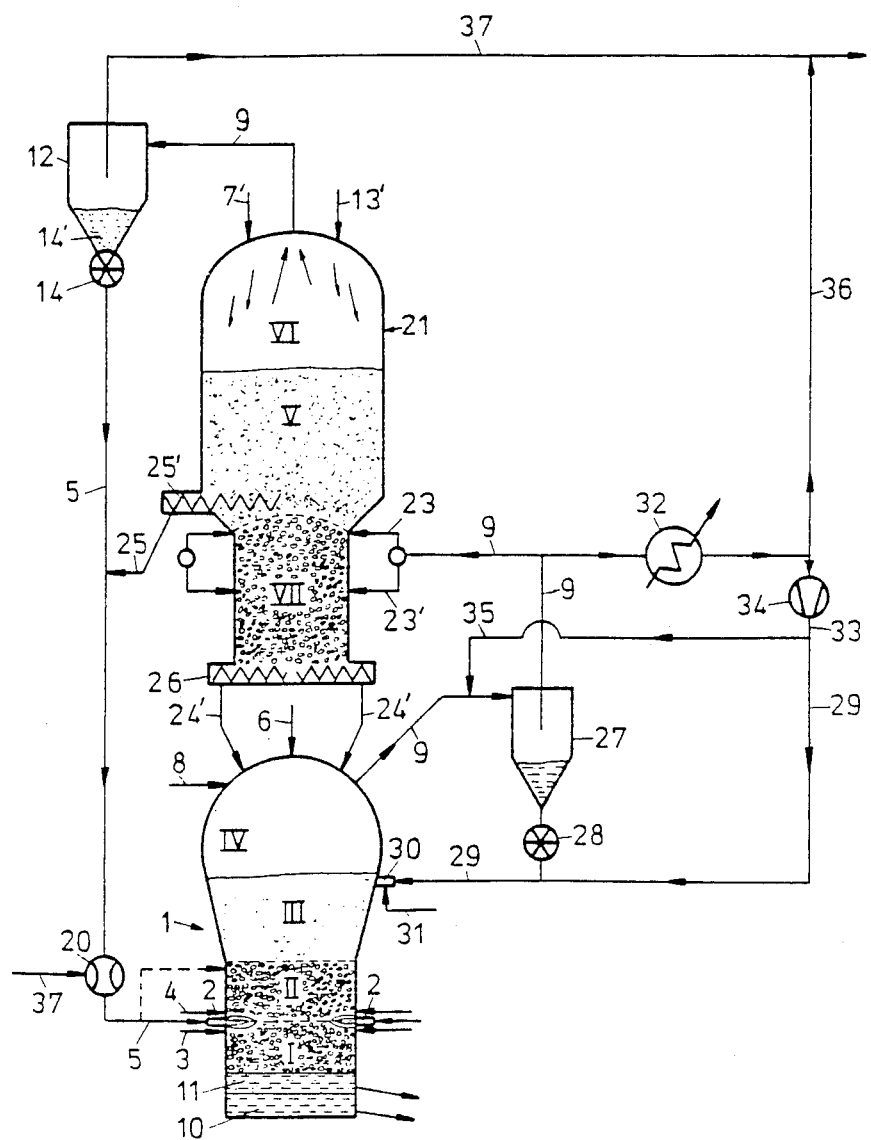

The plant according to FIG. 3 is suited for processing ores whose diameters may amount up to 5 mm. It is operated substantially in the same manner as the embodiment illustrated in FIG. 2. The ore likewise is introduced into the quieting zone VI of the reduction reactor 21 through charging means 7', whereupon its pre-reduction, the separation of fraction A and its complete reduction in the reduction cyclone 12 are effected as described above. Fraction B, which in the present case includes ore particles having diameters of from 0.2 mm to 5 mm passes through the fluidized bed V, the particles having diameters of less than 2 mm being substantially reduced completely, thus allowing for their removal from the lower part of the fluidized bed V by the discharge means 25'. their feeding into duct 5 through duct 25 and their supply to the melter gasifier 1 together with the completely reduced fraction A, as described above.

The pre-reduced ore portion remaining in the fluidized bed V, whose particles have diameters of from 2 mm to 5 mm, reaches the fixed bed VII under the action of gravity and passes the same with the ore being further reduced. Finally, it is fed into duct 24' by the discharge means 22' and blown through the injector 20', along with top gas taken from duct 19', into the melter gasifier 1 in the border region between fluidized bed III and upper fixed bed II (reduction zone of the melter gasifier) and completely reduced and smelted to pig iron.

When processing ores representing a wide grain size range covering grain diameters up to above 1 mm, special demands are set to the reduction reactor with respect to ore fractionation. Accordingly, the reactor 21 represented in FIG. 3 not on y is designed to be conical in its lower part, but there are also provided two blowing planes 2J and 23' for the reducing gas, by which the intensity of the gas feed and, thus, the various ascending and descending speeds of the grain fractions are controllable. For the optimum separation effect, the border between ore fixed bed VII and ore fluidized bed V has proved to settle down in the conical region between the two blowing planes 23 and 23'.

By means of the reducing gas supplied in the upper plane 23, fluidization, fractionation and reduction of the small ore particles are achieved in the first place, while the reducing gas supplied via the lower plane 23' primarily reduces the coarse fraction of the ore.

The smelting of ores representing a grain range that corresponds to particles having diameters up to 20 mm, preferably up to 10 mm, is achieved in a plant according to FIG. 4 substantially corresponding to the embodiment illustrated in FIG. 3, but with which the coarse fraction of the ore (corresponding to particle diameters of more than 2 mm) is directly charged into the quieting zone IV of the melter gasifier 1 by charging means 26.

In the variant of the plant according to the invention illustrated in FIG. 4, a cyclone 27 is provided in the reducing gas duct 9, i.e., between the melter gasifier 1 and the reduction reactor 21, for separating possibly entrained coal dust, which is admitted to duct 29 via discharge means 28 and, by means of cooling gas is blown into the melter gasifier 1 into the upper region of its fluidized bed III or into its quieting zone IV. Tuyeres 30 additionally comprise feed means 31 for oxygen. The cooling gas is comprised of reducing gas freed from coal dust and coming from the melter gasifier 1, taken from the reducing gas duct 9, cooled in a cooler 32, conveyed to a cooling gas blower 34 via a cooling gas duct 33, compressed and finally delivered to duct 29. Alternatively, the cooling gas also may be recycled into the reducing gas duct 9 via a return duct 35. Instead of cooling gas, nitrogen may be used for blowing in coal dust, which may be fed at any point of duct 29.

After the reducing gas has passed the cooler 32, it may also be supplied to a top gas duct 37 via a duct 36.

The way of functioning of the variant of the plant according to the invention illustrated in FIG. 1 corresponds to that described in FIG. 3: The ore is charged into the reduction reactor 21, fraction A is discharged by means of reducing gas, is completely reduced in the reduction cyclone 12 and is supplied to the melter gasifier as described above, the completely reduced fractions being blown in by top gas, nitrogen or any other inert gas. The ore remaining in the quieting zone of the reduction reactor 21, under the action of gravity, gets into the ore fluidized bed V in which those ore particles having diameters of below 2 mm are practically reduced completely and are discharged from the fluidized bed V. The residual ore, furthermore, passes the ore fixed bed VII, which in the embodiment illustrated in FIG. 4, extends over the upper blowing plane 23 of the reducing gas, thereby is further reduced and subsequently is charged into the quieting zone IV of the melter gasifier 1, passing fluidized bed III and fixed beds II and I of coke while being completely reduced and smelted to pig iron.

In the following example, some typical characteristic data of the process according to the invention are indicated, which will be attained when operating the plant according to the invention represented in FIG. 4.

EXAMPLE:

Analysis of the coal used (the values relating to anhydrous analysis material):

| C | 81.4% | |
|---|---|---|
| H | 4.8% | |
| N | 1.4% | |
| O | 5.8% | |
| S | 0.5% | |
| Ashes | 6.2% | |
| Fe | 30.9% | (of the ashes) |
| Cfix | 62.9% | |

Analysis of the iron ore processed:

| Fe | 66.9% |
|---|---|
| FeO | 0.58% |
| $Fe_2O_3$ | 95.0% |
| CaO | 0.025% |
| MgO | 0.13% |
| $SiO_2$ | 0.6% |
| $Al_2O_3$ | 1.31% |
| MnO | 0.38% |
| Annealing loss | 1.6% |

Grain size distribution of the iron ore processed (sieve analysis):

| 5% | 10 mm |
|---|---|
| 10% | 6.3–10 mm |
| 18% | 3.15–6.3 mm |
| 42% | 1.0–3.15 mm |
| 25% | less than 1 mm |

To produce the reducing gas, 7 tons of coal/hour of the above-defined composition were gasified in a plant according to FIG. 4, 580 m3 oxygen/ton pig iron having been consumed. The purity of the oxygen was 95 to 98%. About 14,000 m3 of reducing gas having the following composition were obtained per hour:

| CO | 66.2% |
|---|---|
| $CO_2$ | 4.5% |
| $N_2$ | 0.5% |
| $H_2$ | 28.5% |
| $CH_4$ | 0.3% |

The clear tube velocities within the melter gasifier 1 and within the reduction reactor 21 range between 0.3 and 0.5 m/s, while the clear tube velocities between the two tuyere planes of the reduction reactor 21 amounted to between 1.5 and 3 m/s.

It was possible to process 12.85 tons of iron ore per hour, the melting performance amounting to 8.1 ton of pig iron per hour. The pig iron obtained, in addition to iron, contained the following components:

| C | 4% |
|---|---|
| Si | 0.6% |
| Phosphorus | 0.01% |
| Manganese | 0.1% |
| Sulfur | 0.04%. |

What I claim is:

1. In a process for the production of molten pig iron by melt-reducing iron ores of various grain sizes containing an ore fraction A comprised of grain sizes corresponding to diameters of less than 0.2 mm, which process includes pre-reducing said iron ores by means of reducing gas so as to obtain pre-reduced material, completely reducing said pre-reduced material so as to obtain completely reduced material, and smelting said completely reduced material in a melter gasifier including a melting zone so as to obtain molten pig iron, the melter gasifier including an oxygen blowing plane, a tuyere plane and a coke bed region, the improvement comprising separating said ore fraction A after pre-reduction from a fraction B comprised of particles having larger grain sizes by classification by means of reducing gas, completely reducing said fractions A and B separately, and supplying said completely reduced fractions A and B to said melting zone of the melter gasifier.

2. A process as set forth in claim 1, wherein a reduction cyclone is provided for completely reducing said fraction A.

3. A process as set forth in claim 1, wherein said fraction B comprises grain sizes corresponding to diameters of from 0.2 mm to 2 mm, said fraction B being passed under the action of gravity through a fluidized bed located in a reduction reactor flowed through by reducing gas, and completely reduced.

4. A process as set forth in claim 1, wherein said completely reduced fractions A and B are supplied to the melter gasifier in the region of the oxygen blowing plane.

5. A process as set forth in claim 1, wherein said completely reduced fractions A and B are supplied to the melter gasifier above the oxygen blowing plane in the coke bed region.

6. A process as set forth in claim 1, wherein said fraction B comprises grain sizes corresponding to diameters of from 0.2 mm to 5 mm, said fraction B being passed under the action of gravity through a fluidized bed located in a reduction reactor flowed through by reducing gas, and which process further comprises separating from said fraction B a fraction B1 comprised of grain sizes corresponding to diameters of below 2 mm and a fraction B2 comprising grain sizes corresponding to diameters of at least 2 mm, said fraction B2 being additionally conducted under the action of gravity through a fixed bed located in the reduction reactor flowed through by reducing gas and further reduced.

7. A process as set forth in claim 6, wherein said portion B1 after reduction is supplied to the melter gasifier in the region of the oxygen blowing plane and said portion B2 after reduction is supplied to the melter gasifier above the tuyere plane.

8. A process as set forth in claim 6, wherein said portion B1 after reduction is supplied to the melter gasifier above the oxygen blowing plane in the region of the coke bed and said portion B2 after reduction is supplied to the melter gasifier above the tuyere plane.

9. A process as set forth in claim 7, wherein said fraction B further comprises grain sizes corresponding to diameters of up to 20 mm, and wherein said portion B2 is introduced into a quieting zone located in the melter gasifier.

10. A process as set forth in claim 7, wherein said fraction B further comprises grain sizes corresponding to diameters up to 10 mm, and wherein said portion B2 is introduced into a quieting zone located in the melter gasifier.

11. A process as set forth in claim 8, wherein said fraction B further comprises grain sizes corresponding to diameters of up to 20 mm, and wherein said portion B2 is introduced into a quieting zone located in the melter gasifier.

12. A process as set forth in claim 8, wherein said fraction B further comprises grain sizes corresponding to diameters up to 10 mm, and wherein said portion B2 is introduced into a quieting zone located in the melter gasifier.

* * * * *